# 3,033,856
NOVEL ESTRADIENE AND PREPARATION THEREOF

Gérard Nominé, Noisy Le Sec, and Robert Bucourt, Villiers Le Bel, France, assignors to Les Laboratoires Francais de Chimiotherapie, Paris, France, a corporation of France
No Drawing. Filed Oct. 30, 1961, Ser. No. 148,748
Claims priority, application France Nov. 4, 1960
9 Claims. (Cl. 260—239.5)

The invention relates to the novel estradiene, 17α-ethynyl-$\Delta^{5(10),9(11)}$-estradiene-17β-ol-3-one. The invention also relates to a process for the preparation of the said estradiene and novel intermediates formed therein. 17α-ethynyl-$\Delta^{5(10),9(11)}$-estradiene-17β-ol-3-one possesses physiological activity and particularly hypophysial inhibiting activity and more particularly an anti-hormone-folliculo-stimulant activity (anti F.S.H. activity).

It is an object of the invention to provide the novel compound, 17α - ethynyl - $\Delta^{5(10),9(11)}$ - estradiene-17β-ol-3-one.

It is another object of the invention to provide a novel process for the preparation of 17α-ethynyl-$\Delta^{5(10),9(11)}$-estradiene-17β-ol-3-one.

It is a further object of the invention to provide the novel enamine intermediates, 3-substituted amino-17α-ethynyl-$\Delta^{3,5(10),9(11)}$-estratriene-17β-ols.

These and other objects and advantages will become obvious from the folowing detailed description.

The process for the preparation of 17α-ethynyl-$\Delta^{5(10),9(11)}$-estradiene-17β-ol-3-one according to the invention comprises reacting 17α-ethynyl-$\Delta^{4,9}$-estradiene-17β-ol-3-one with an amine selected from the group consisting of di-lower alkyl amines, pyrrolidine, piperidine and morpholine in an inert organic solvent to form a enamine having the formula

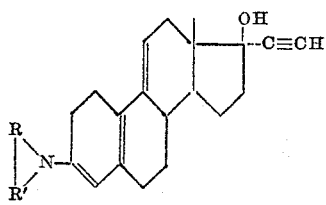

where R and R' are lower alkyls and when taken together with the nitrogen atom are selected from the group consisting of pyrrolidyl, piperidyl and morpholino, hydrolyzing the latter under acidic conditions to form 17α-ethynyl-$\Delta^{5(10),9(11)}$-estradiene-17β-ol-3-one and recovering the latter. The reaction scheme is illustrated in Table I.

TABLE I

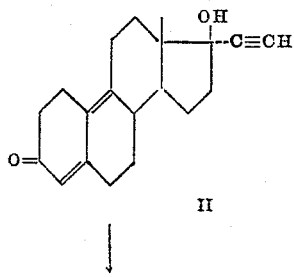

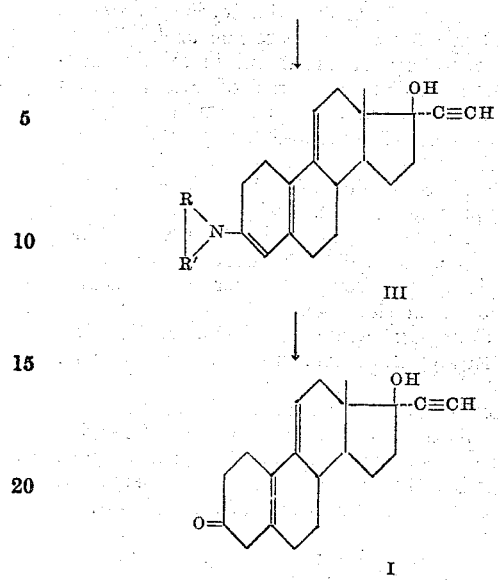

wherein R and R' are lower alkyls and when taken together with the nitrogen atom are selected from the group consisting of pyrrolidyl, piperidyl and morpholino.

The inert organic solvent may be a hydrocarbon such as benzene, a halogenated hydrocarbon such as chloroform, a lower alkanol such as methanol or ethanol, etc. The solvent system may also be a mixture of solvents.

Examples of suitable di-lower alkyl amines which may be used in the first step of the process are dimethyl amine, methyl ethyl amine, diethyl amine, diisopropyl amine, dibutyl amine, etc.

A preferred process of the invention comprises reacting 17α-ethynyl-$\Delta^{4,9}$-estradiene-17β-ol-3-one with pyrrolidine in a lower alkanol such as methanol at reflux temperatures to form 3-pyrrolidyl-17α-ethynyl-$\Delta^{3,5(10),9(11)}$-estratriene-17β-ol, hydrolyzing the latter in the presence of a lower alkanoic acid such as formic acid or acetic acid at room temperatures to form 17α-ethynyl-$\Delta^{5(10),9(11)}$-estradiene-17β-ol-3-one and recovering the latter.

The starting material, 17α-ethynyl-$\Delta^{4,9}$-estradiene-17β-ol-3-one, may be obtained according to the method disclosed by Perelman et al., J. Am. Chem. Soc., vol. 82 (1960), p. 2402.

In the following example there are described several preferred embodiments to illustrate the invention. However, it should be understood that the invention is not intended to be limited to the specific embodiments.

The melting points are instantaneous melting points determined on the Kofler block. The temperatures are indicated in degrees centigrade.

EXAMPLE

*Preparation of 17α-Ethynyl-$\Delta^{5(10),9(11)}$-Estradiene-17β-Ol-3-One*

STEP A.—PREPARATION OF THE ENAMINE 300 mg. of 17α-ethynyl-$\Delta^{4,9}$-estradiene-17β-ol-3-one were introduced into 0.3 cc. of pyrrolidine. The mixture was heated to 85° C. for a period of five minutes. 3 cc. of methanol were added and the mixture was heated to reflux for a period of five minutes. The mixture was cooled and the product formed was vacuum filtered, washed with methanol and dried. 0.244 grams (being a 67% yield) of 3-pyrrolidyl-17α-ethynyl-Δ[3,5(10),9(11)]-estratriene-17β-ol, having a melting point of 105° C., then 175° C., were obtained.

The product was used without further purification for the next step of the synthesis.

It is not described in the literature.

STEP B.—HYDROLYSIS OF THE ENAMINE 277 mg. of the enamine obtained according to Step A were dissolved in 0.3 cc. of pure formic acid. To the solution 3 cc. of water were added and the reaction mixture was allowed to stand for a period of several minutes before being iced and vacuum filtered. Raw 17α-ethynyl-Δ[5(10),9(11)]-estradiene-17β-ol-3-one was obtained. By chromatography over magnesium silicate with elution with methylene chloride containing 0.1% of methanol and 1% of acetone, the pure product was obtained having a melting point of 156° C. and a specific rotation $[\alpha]_D^{20} = +136.5°$ (c=0.4% in methanol). The product was a white product soluble in hot isopropyl ether and insoluble in water and dilute aqueous acids.

*Analysis.*—$C_{20}H_{24}O_2$; molecular weight=296.39. Calculated: C, 81.04%; H, 8.16%. Found: C, 80.8%; H, 8.3%.

This product is not described in the literature.

Various modifications of the process of this invention may be made without departing from the spirit or scope thereof, and it is to be understood that the invention is to be limited only as defined in the appended claims.

We claim:
1. 17α-ethynyl-Δ[5(10),9(11)]-estradiene-17β-ol-3-one.
2. A compound having the formula

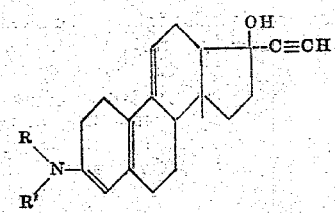

wherein R and R′ are lower alkyls and when taken together with the nitrogen atom are selected from the group consisting of pyrrolidyl, piperidyl and morpholino.

3. 3-pyrrolidyl - 17α - ethynyl-Δ[3,5(10),9(11)]-estratriene-17β-ol.

4. A process for the preparation of 17α-ethynyl-Δ[5(10),9(11)]-estradiene-17β-ol-3-one which comprises reacting 17α-ethynyl-Δ[4,9]-estradiene-17β-ol-3-one with an amine selected from the group consisting of di-lower alkyl amines, piperidine, pyrrolidine and morpholine in an inert organic solvent to form a compound having the formula

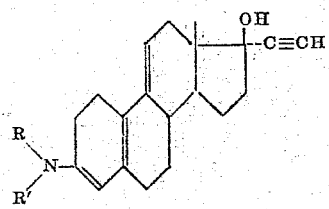

wherein R and R′ are lower alkyls and when taken together with the nitrogen atom are selected from the group consisting of pyrrolidyl, piperidyl and morpholino, hydrolyzing the latter under acidic conditions to form 17α-ethynyl-Δ[5(10),9(11)]-estradiene-17β-ol-3-one and recovering the latter.

5. The process of claim 4 wherein the amine is pyrrolidine.

6. The process of claim 4 wherein the hydrolysis is effected in the presence of a lower alkanoic acid.

7. A process for the preparation of 17α-ethynyl-Δ[5(10),9(11)]-estradiene-17β-ol-3-one which comprises reacting 17α-ethynyl-Δ[4,9]-estradiene-17β-ol-3-one with pyrrolidine in a lower alkanol to form 3-pyrrolidyl-17α-ethynyl-Δ[3,5(10),9(11)]-estratriene-17β-ol, hydrolyzing the latter in the presence of a lower alkanoic acid to form 17α-ethynyl-Δ[5(10),9(11)]-estradiene-17β-ol-3-one and recovering the latter.

8. The process of claim 7 wherein the lower alkanol is methanol and the enamine reaction is conducted at the reflux temperature.

9. The process of claim 7 wherein the lower alkanoic acid is formic acid.

No references cited.